Patented Oct. 6, 1925.

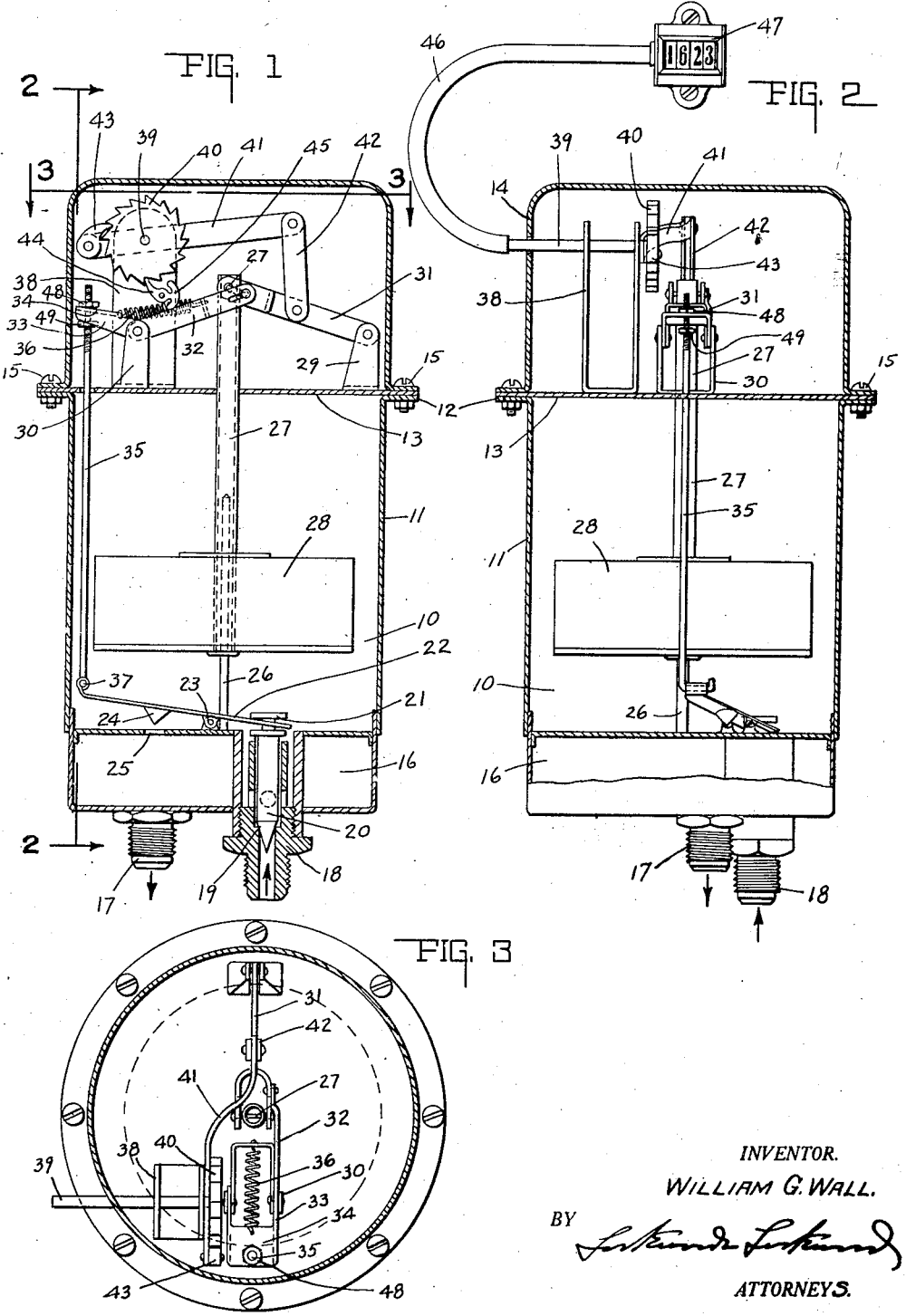

1,556,186

UNITED STATES PATENT OFFICE.

WILLIAM G. WALL, OF INDIANAPOLIS, INDIANA.

LIQUID METER.

Application filed August 19, 1922. Serial No. 583,017.

*To all whom it may concern:*

Be it known that I, WILLIAM G. WALL, a citizen of the United States, and a resident of Indianapolis, county of Marion, and State of Indiana, have invented a certain new and useful Liquid Meter; and I do hereby declare that the following is a full, clear, and exact description thereof, reference being had to the accompanying drawings, in which like numerals refer to like parts.

This invention relates to a meter or measuring device for liquid, and is particularly adapted to measure liquid wherein the flow is at an extremely slow rate, such as is found in measuring the quantity of gasoline flow to an internal combustion engine used for propelling motor vehicles.

Liquid meters of the usual design are adaptable only for use in connection with liquid having an appreciable flow and pressure. There are many ways in which a measuring meter can be made which will indicate the quantity of liquid passing through the device, provided there is a sufficient pressure and quantity of flow. The difficulty in devising a meter for use in connection with a motor driven vehicle is the extremely small pressure which often exists, and at times the extremely slight flow.

The particular feature of this invention resides in a mechanism for measuring the quantity of gasoline passing through the carbureter of an internal combustion engine, wherein the pressure is negligible and the flow is often very slight. This is accomplished by utilizing a measuring chamber having a single float so arranged that it will move up and down with the filling and emptying of the chamber, each alternative movement of the float, either the upward movement or the downward movement, being adapted to actuate the meter by means of a ratchet wheel and suitable connections.

Another feature of this invention is to provide a meter of the above character having a few operative parts, and simply arranged, whereby it will function positively and accurately and be commercially practical.

The invention will be understood from the accompanying drawings and the following description and claims:

In the drawings, Figure 1 is a central vertical section taken through the measuring chamber and housing. Fig. 2 is a side elevation of the meter with a portion of the top wall broken away. Fig. 3 is a section taken on the line 3—3 of Fig. 1.

In the drawings there is shown a tank comprising a measuring chamber 10 having an outer shell 11 provided at its top with a peripheral flange 12. Mounted on the flange 12 there is a partition 13 upon which is mounted a top housing 14, said housing 14 being secured upon the flange 12 of the shell 11 by means of the screws 15. Rigidly secured to the bottom of the tank there is a dispensing chamber 16 which receives the gasoline from the measuring chamber 10 and allows it to gradually flow to the carbureter through an outlet connection 17.

Extending through the bottom of the device, and through the chamber 16 so as to communicate with the measuring chamber 10 there is an inlet connection 18 having a valve seat 19 in which a valve pin 20 is adapted to seat for closing the passageway therein. The valve pin is provided with a flanged head 21 adapted to be engaged by a lever 22 which is pivoted upon the bottom of the chamber 10 at 23. The lever 22 is provided with a valve 24 adapted to seat in an opening 25 through which the chambers 10 and 16 communicate. It will be obvious that when the lever 22 is moved to one position, it will open the passageway 25 and close the inlet 18. This permits the gasoline contained in the measuring chamber to empty into the dispensing chamber, preventing gasoline from entering the chamber 10 while it is being emptied. When said lever is moved to the other position, the passage 25 is closed and the inlet 18 opened, permitting gasoline to fill the chamber 10.

Centrally mounted in the measuring chamber 10 there is a supporting rod 26 extending vertically therein and rigidly supported upon the bottom. Slidably mounted on said rod and supported thereby, there is a tubular stem 27 which is held in vertical position so as to reciprocate up and down thereon. Attached to the stem 27 there is a float 28 in position to be raised and lowered by the level of the gasoline contained in the chamber 10. Mounted upon the partition 13 above the chamber 10 there are supporting brackets 29 and 30. The bracket 29 has pivoted thereto at one end a lever 31, said lever having the other end bifurcated and pivotally secured to the upper end of the stem 27. A lever 32 is pivoted at one end to the lever 31 adjacent its connection with the stem 27 and at its other end to the supporting bracket 30. A lever 33 is pivoted at one end to the bracket 30 and is provided with a saddle 34 through which the end of a connecting rod 35 extends, said connecting rod being provided with a nut below and above the saddle 34 so as to limit its movement with respect thereto, and pivotally connected at its lower end to the lever 22 by a pin 37. The saddle 34 is connected to the opposite end of the lever 32 by a spring 36.

Carried upon a suitable bracket 38 mounted on the partition 13, there is a shaft 39 extending horizontally through the housing 14. Rigidly secured upon the inner end of the shaft 39 there is a ratchet wheel 40 and fulcrumed thereon there is a lever 41. One end of the lever 41 is connected to the lever 31 by a link 42, said link being pivoted substantially midway between the ends of the lever 31. On the opposite end of the lever 41 there is pivotally mounted a pawl 43 in position to engage the teeth of the ratchet wheel 40 for rotating the same. Immediately below said ratchet wheel there is pivotally mounted on the bracket 38 a finger 44 having a weighted end 45 so arranged that it is normally in engagement with the teeth of the ratchet wheel for preventing its reverse movement. The end of the shaft 39 opposite the ratchet wheel 40 is connected with a flexible shaft 46, which may extend, if desired, to the instrument board to be connected with the usual type of register 47.

In operation the gasoline enters the measuring chamber 10 through the inlet connection 18, the valve pin 20 being raised so as to permit its flow therethrough. As the level of the liquid raises, it will engage and raise the float 28. As the float 28 is raised, since it is secured upon the stem 27, it will cause said stem to be forced upwardly, thereby carrying upward the end of the lever 31 to which it is pivoted. The upward movement of the lever 31 will force upwardly the link 42 and the end of the lever 41 will carry the pawl 43 down into a new position and engagement with another tooth of the ratchet wheel. The same upward movement of the float will raise the lever 32 so as to cause the spring 36 to pass over center and pull up quickly upon the lever 33. The movement of said lever will raise the connecting rod 35 with a quick movement, which will simultaneously lower the valve pin 20, closing the inlet and shutting off the further supply of gasoline, and open the valve 24, permitting the gasoline in the chamber 10 to flow into the chamber 16. As the gasoline flows from the measuring chamber, the float will be lowered by gravity, pulling down the lever 31, link 42 and lever 41 so as to raise the pawl 43 and cause it to turn the ratchet wheel one unit of revolution, which will in turn operate the counter to indicate numerically the quantity of gasoline which has just been received into the chamber and discharged therefrom. The same lowering movement of the stem 27 will pull down on the lever 32, carrying the spring 36 below center, which will snap the lever 33 and connecting rod 35 downwardly, so as to quickly and simultaneously close the opening 25 and lift the pin 20 for permitting a new supply of gasoline to pass into the chamber 10 through the inlet connection 18. The operating capacity of the chamber 10 and the counting elements may be so arranged that the counter will indicate gallons of liquid or fractions thereof.

The meter may be calibrated by adjusting the nuts on the rod 35 so as to obtain any unit of measurement desired within the capacity of the chamber 10.

The invention claimed is:

1. A liquid meter including a casing having a measuring chamber, a float mounted in said chamber, a vertically-extending connecting stem secured to said float at one end, an actuating lever having one end pivotally connected to the other end of said stem, a bracket to which the other end of said actuating lever is pivoted, a rotating shaft having a ratchet wheel mounted on one end thereof, and a second lever pivotally connected at one end to said first-mentioned lever and provided with a pawl on the other end thereof for engaging and rotating said ratchet wheel upon the vertical movement of said float.

2. A liquid meter including a casing having walls forming a measuring chamber, a float contained in said chamber, a stem secured to said float, a lever pivoted at one end to said stem and at the other end to said casing, a rotating shaft supported in said casing and having a ratchet wheel mounted on one end thereof, a second lever fulcrumed on said shaft, a link connecting one end of said second-mentioned lever with said first-mentioned lever, and a pawl pivotally mounted upon the other end of said second-mentioned lever in position to engage said ratchet wheel for causing the rotation thereof upon the vertical movement of said float.

3. A liquid meter including a casing having walls forming a measuring chamber provided with inlet and outlet ports, a float contained in said chamber, a supporting rod vertically secured centrally of said chamber, a hollow stem slidably mounted on said rod to which said float is secured for raising and lowering said stem in accordance with the level of the liquid maintained in said chamber, mechanism connected with the upper end of said stem for registering the movement thereof, an inlet and outlet valve for said ports, a lever fulcrumed upon the bottom of said chamber connected with said inlet and outlet valves for controlling said ports, and a connecting rod pivoted at one end to said lever and at the other end to said mechanism for controlling said ports upon the operation of said stem.

4. A liquid meter comprising a float-controlled actuating mechanism, said mechanism including a reciprocating stem having a float secured thereon, a casing surrounding said mechanism, a lever pivoted at one end to said stem and at the other end to said casing, a register, a register-actuating shaft pivotally supported in said casing and having a ratchet wheel secured thereon, a lever fulcrumed on said shaft, a link pivotally connecting one end of said last-mentioned lever with said first-mentioned lever, a pawl pivotally mounted on the opposite end of said second-mentioned lever in position to engage and operate said ratchet wheel in one direction, and a weighted finger pivotally mounted on said casing in position to engage said ratchet wheel for preventing its movement in a reverse direction, whereby the movement of said float when in one direction will cause the rotation of said ratchet wheel.

5. A liquid meter comprising a casing having walls forming a measuring chamber with inlet and outlet ports provided with suitable valves therefor, a float contained in said chamber, a stem secured to said float, an actuating lever pivoted at one end to said stem and at the other end to said casing, a register, a register-operating lever pivotally connected at one end with said actuating lever and provided at the opposite end with means for operating said register, a valve-operating lever fulcrumed on said casing for opening and closing said valves, a trip lever pivoted at one end to said actuating lever and at the other end to said casing, a rod-actuating lever pivoted at one end to said casing, a spring connecting the free end of said rod-actuating lever with said trip lever, and a connecting rod connected with said rod-actuating lever and said valve-actuating lever for simultaneously causing one valve to open and the other to close upon the movement of said levers by said float.

6. A liquid meter including a casing having walls forming a measuring chamber, a float contained in said chamber, a stem secured to said float, a lever pivoted at one end to said stem and at the other end to said casing, a rotating shaft supported in said casing, a second lever fulcrumed on said shaft, a link connecting one end of said second mentioned lever with said first mentioned lever, and means pivotally mounted upon the other end of said second mentioned lever in position to cause the rotation of said shaft upon the vertical movement of said float.

7. A liquid meter having a casing enclosing a measuring chamber and a dispensing chamber below said measuring chamber, said measuring chamber having an inlet, and an outlet communicating with said dispensing chamber, and a compartment positioned above said measuring chamber, mechanism in said compartment for registering the quantity of liquid passing through said measuring chamber, a float positioned in said measuring chamber, a stem connecting said float with said mechanism for actuating the same, a lever pivoted at the bottom of said chamber, valves connected with said lever on each side of its pivot mounting for opening and closing the inlet and outlet to said chamber, a spring-actuated connecting rod pivoted at one end to said lever and at the other end to said mechanism for operating said valves through the movement thereof, and an adjustable nut on said rod for calibrating said meter whereby any desired unit of measurement may be obtained within the capacity of said chamber.

In witness whereof, I have hereunto affixed my signature.

WILLIAM G. WALL.